US005660409A

United States Patent [19]
Hensley

[11] Patent Number: 5,660,409
[45] Date of Patent: Aug. 26, 1997

[54] ANTISWAY TRAILER HITCH WITH SURGE BREAK ACCOMMODATIONS

[76] Inventor: James C. Hensley, 879 Green Street Rd., Centralia, Ill. 62801

[21] Appl. No.: 654,891

[22] Filed: May 29, 1996

[51] Int. Cl.[6] .............................. B60D 1/06; B62D 53/00
[52] U.S. Cl. .................. 280/455.1; 280/492; 280/460.1; 280/511
[58] Field of Search .............................. 280/400, 446.1, 280/447, 456.1, 455.1, 459, 460.1, 462, 492, 504, 511

[56] References Cited

U.S. PATENT DOCUMENTS

| | | |
|---|---|---|
| 1,992,164 | 2/1935 | Amer .................... 280/446.1 X |
| 2,133,065 | 10/1938 | Weber . |
| 2,640,710 | 6/1953 | Duffy ...................... 280/446.1 |
| 2,704,218 | 3/1955 | Claud-Mantle . |
| 2,871,029 | 1/1959 | Demarest . |
| 2,940,776 | 6/1960 | Curtis . |
| 3,057,644 | 10/1962 | Fisher . |
| 3,279,819 | 10/1966 | Edmonds . |
| 3,520,556 | 7/1970 | Warner . |
| 3,602,529 | 8/1971 | Derr, Jr. . |
| 3,690,699 | 9/1972 | Derr, Jr. . |
| 3,751,069 | 8/1973 | Suckow . |
| 3,778,088 | 12/1973 | Alexander . |
| 3,787,068 | 1/1974 | Miller . |
| 3,861,717 | 1/1975 | Knox . |
| 3,871,686 | 3/1975 | Rendessy . |
| 3,891,237 | 6/1975 | Allen . |
| 3,891,238 | 6/1975 | Ehlert . |
| 3,948,544 | 4/1976 | Presley et al. . |
| 3,964,767 | 6/1976 | Williams . |
| 4,077,234 | 3/1978 | Crochet, Sr. . |
| 4,178,011 | 12/1979 | Kirsch . |
| 4,196,918 | 4/1980 | Strader . |
| 4,198,073 | 4/1980 | Olsen . |
| 4,213,627 | 7/1980 | Thompson . |
| 4,281,847 | 8/1981 | Robe . |
| 4,312,516 | 1/1982 | Olsen . |
| 4,511,159 | 4/1985 | Younger . |
| 4,515,387 | 5/1985 | Schuck . |
| 4,560,184 | 12/1985 | Williams, Jr. . |
| 4,582,337 | 4/1986 | Hsueh . |
| 4,606,549 | 8/1986 | Willaims, Jr. . |
| 4,613,149 | 9/1986 | Willaims, Jr. . |
| 4,811,967 | 3/1989 | Hensley . |
| 5,222,754 | 6/1993 | Few . |

FOREIGN PATENT DOCUMENTS

2057388 11/1970 Germany .

*Primary Examiner*—Victor E. Johnson
*Attorney, Agent, or Firm*—Polster, Lieder, Woodruff & Lucchesi, L.C.

[57] ABSTRACT

An anti-sway trailer hitch for connecting a trailer to a tow vehicle. The hitch includes a first pivotal element attached to the tow vehicle and a second pivotal element attached to the trailer with a set of a converging link assembly on the first element connecting it to the second element. The converging link assembly projects the effective pivot point forward adjacent the rear axle of the tow vehicle and prevents lateral sway while allowing changes in the angular relationship between the two elements as the tow vehicle and trailer negotiate turns. The second pivotal element includes a yoke attached to the trailer frame. The yoke includes Spaced apart side members with a hitch ball mount in sliding engagement with the side members. The trailer is attached to the hitch ball. A pivotally attached strut extends between the first pivotal element and the hitch ball mount. As the radius of the Converging links shortens or lengthens during and after turns, and the yoke is drawn toward or away from the tow vehicle, the strut maintains the hitch ball mount, with the trailer attached thereto, at a predetermined distance from the tow vehicle. The strut also reduces push-pull stresses on the converging link assembly by directing those stresses to the tow vehicle hitch bar.

21 Claims, 5 Drawing Sheets

ANTISWAY TRAILER HITCH WITH SURGE BREAK ACCOMMODATIONS

BACKGROUND OF THE INVENTION

This invention relates generally to trailers and more particularly to an anti-sway hitch assembly used for coupling a trailer to a tow vehicle.

Automobiles and pick-up trucks long have been used to tow trailers such as utility trailers, camping trailers and boat trailers. Typically, the trailer is connected to the tow vehicle through a ball and socket coupling located at the rear of the tow vehicle. More specifically, the tow vehicle is fitted with a hitch ball which projects upwardly in the region of the rear bumper of the vehicle, while the trailer has a socket coupler on a forward projecting tongue, the socket firing over and closing around the hitch ball to secure the trailer to the tow vehicle. The ball and socket arrangement allows the tow trailer to turn relative to the tow vehicle so that the combination is maneuverable. However, Such a ball and socket collection also allows the trailer to rock forwardly and rearwardly with respect to the tow vehicle, and also rock left and right with respect to the tow vehicle.

The offset of the hitch from the rear axle of the tow vehicle detracts from the overall stability of the combination, particularly at higher speeds, for it enables and induced forces to cause a swaying motion known as fishtailing. The wind simply may be surface winds or gusts of winds produced by a storm. The wind may also be generated by large vehicles, such as an over-the-road truck, traveling at a high rate of speed. Such vehicles can create wind turbulence that affects any other vehicle which happens to be along side of it. Inertial forces created by uneven road surfaces may also produce fishtailing.

Irrespective of its source, fishtailing is dangerous because it may cause the driver of the tow vehicle to lose control of the vehicle. Moreover, fishtailing imposes severe stresses on the trailer hitch and the frame components to which it is attached. Fishtailing likewise imposes severe demands on the suspension system of the tow vehicle, and may cause components such as shock absorbers, bushings and springs to experience excessive wear or to fail.

While large over-the road tractor-trailer combinations would appear to be more susceptible to fishtailing, they are not. This derives from the fact that the pivot axis for the trailer is set generally over the rear axle of the tractor. In vehicles with tandem rear axles, the pivot mechanism or fifth wheel, as it is called, often is located over the space between the two axles. In any event, tractor-trailer combinations do not pivot substantially behind the rear axle or axles of the tractor and, therefore, these combinations possess good stability at high speeds.

Generally, most devices previously known for reducing swaying and fishtailing had the effect of stiffening the pivot joints. They are not very effective and impose substantial stresses on the vehicular components, particularly when turns are negotiated. Other devices, such as the hitch disclosed in U.S. Pat. No. 4,019,754 function by shifting the effective pivot point forward. However, that hitch mechanism does not accommodate sharp turns of the type one may encounter when attempting to park a trailer in a confined parking space or when navigating on city streets.

My trailer hitch assembly, disclosed in U.S. Pat. No. 4,722,542, provides a trailer hitch which allows a trailer to be towed without significant swaying or fishing tailing by effectively placing the pivot axis forwardly of its location and while being capable of accommodating sharp turns.

Although my previous trailer hitch works well for its intend purposes, it sometimes exhibits limited applications. For example, the hitch works exceedingly well in larger, heavier trailers, for example camping trailers. These larger camping trailers generally employ their own brakes, usually electric brakes associated with the trailer wheels that are simultaneously actuated when the driver actuates the tow vehicle brakes.

Smaller or lighter weight trailers, such as boat trailers or other light-duty trailers, generally are equipped with a surge brake mechanism. Basically, the surge brake works through a hydraulic system wherein a master cylinder in the coupler or socket housing located on the trailer tongue is actuated by forward movement of the trailer against the hitch ball. This forward motion applies a brake to the trailer wheels in response to the force of the trailer against the tow vehicle as the trailer surges forward when the tow vehicle slows. Surge brake assemblies have been used to control lateral movement, i.e. fishtailing. For example, U.S. Pat. No. 3,948,544 discloses hydraulic surge brakes that operate the right trailer brake in response to lateral forces to the left and operates the left trailer brake in response to lateral forces to the left.

It subsequently became apparent that my anti-way trailer hitch, as disclosed in the U.S. Pat. No. 4,722,542 does not work well in combination with a conventional surge brake system. Since my trailer hitch so effectively controls unwanted side-to-side and forward and rearward movement of the trailer, there is little or no movement to actuate a surge brake mechanism employed by the trailer.

Further, in trailer and tow vehicle combinations that allow some forward or rearward movement of the trailer relative to the tow vehicle, there are significant stresses placed on the hitch. In conventional trailer hitches, the forward or rearward stresses are concentrated on the hitch bar attached to the tow vehicle. Further, as the tow vehicle moves forward and backward there are significant push-pull forces on the trailer hitch. Conventional hitch bars are constructed to accommodate such stresses. However, in a hitch employing my novel converging links mechanism much of the forward or rearward stress is applied to the converging links mechanism. Forward pressure on the converging links can cause undesired side-to-side movement or folding of the links with a trailer having no brakes or surge brake. Moreover, such force could cause premature wear of the converging links assemblies. It would be advantageous, therefore, to have a trailer hitch employing converging links mechanism that prevents fish-tailing yet could be used on a light weight trailer employing surge brakes. Furthermore, it also would be advantageous to have a hitch assembly in which the forward or rearward stresses would be borne by the hitch box, hitch bar or other strut and not the converging links mechanism.

SUMMARY OF THE INVENTION

It is among the principal objects of the present invention to provide a trailer hitch assembly which, although being offset from the rear wheels of the tow vehicle, enables the towed trailer to be moved without significant swaying or fishtailing.

Another object of the present invention is to provide such an anti-sway trailer hitch that employs a converging link mechanism to allow articulation of the trailer hitch while limiting sway by placing the effective pivot point adjacent the tow vehicle axle.

Still another object of the present invention is to provide such an anti-sway trailer hitch employing converging link mechanism wherein the converging links mechanism allows articulation of the trailer hitch while controlling sway but does not receive forward or rearward stresses inherent when towing a trailer.

Another object of the invention is to provide such an anti-sway trailer hitch that can maintain the trailer a predetermined distance away from the rear end of the tow vehicle even as the tow vehicle and trailer negotiate a relatively tight turn.

It is another object of the invention to provide such an anti-sway trailer hitch assembly that can accommodate a surge brake mechanism.

Another object of the invention is to provide such an anti-sway trailer hitch that can be used with light weight trailers that do not employ electric brakes as well as those that do employ electric or other brakes.

Still another object of the invention is to provide such an anti-sway trailer hitch assembly that can be used with a light weight trailer employing surge brake mechanism that allows the tow vehicle and trailer to negotiate sharp turns of the type encountered in an urban area or when attempting to position the trailer in a parking place.

Yet another object of the invention is to provide such an anti-sway trailer hitch assembly that is simple in construction, easy and economical to manufacture and assemble, reliable in service, and well-suited to its intended purposes.

In accordance with the invention, an anti-sway trailer hitch assembly is provided that can be utilized with a trailer that may include a surge brake mechanism. The hitch assembly includes a first pivot member mounted on the rear of the tow vehicle and a second pivot member attached to the tongue or hitch mounting frame of the trailer such that the second pivot member is restricted from turning relative to the trailer. The first pivot member includes a pair of connecting links pivotally connected to the second member and extending between the first and second pivot members, the links converging forwardly. The connecting links are designed to allow the tow vehicle and trailer to negotiate sharp turns while resisting lateral movement or sway by placing the effective pivot point adjacent the rear axle of the tow vehicle.

The second pivot member includes a yoke that extends under the trailer hitch mounting frame. The yoke is removably attached to the connecting links by an adjustable coupler assembly that a some flexure at that junction without excessive wear. The yoke includes a pair substantially parallel, spaced apart side frame members. Each frame member defines a channel. There is a T-shaped trailer mount including a conventional hitch ball, for conventional attachment of the trailer's coupler or socket, which slidingly engages the yoke at the channels. The rear end of the trailer mount is supported by a frame bracket secured to the trailer tongue at a point an appropriate distance behind the second pivot member. A strut extends between the first pivot element and the trailer mount. One end of the strut is pivotally attached to the first pivot element and the other end is pivotally attached at the rear end of the trailer mount. The pivotally mounted strut functions to maintain to a predetermined distance between the tow vehicle and trailer mount, and thus the trailer, as the tow vehicle negotiate turns.

Since the yoke is connected to the connecting links, as the radius of the connecting links shortens, for example, as the vehicle is turning, the yoke is drawn toward the first pivot element and hence toward the tow vehicle. As the radius of the connecting links lengthens, for example as the tow vehicle and trailer move to a straight ahead alignment, the yoke is urged away from the tow vehicle. The trailer mount and hitch ball is held in place by the strut and remains a predetermined distance from the tow vehicle as the yoke moves forward and backward. The distance is determined by the length of the strut. Therefore, the trailer always remains the same distance from the tow vehicle, despite turning. However, since the slidable arrangement the yoke and ball mount allows some forward movement of the trailer relative to the hitch ball, a surge brake assembly on the trailer tongue can be actuated.

BRIEF DESCRIPTION OF THE DRAWINGS

Corresponding reference figures indicate corresponding elements throughout the various drawings.

DESCRIPTION OF THE PREFERRED EMBODIMENT

Figure 1:
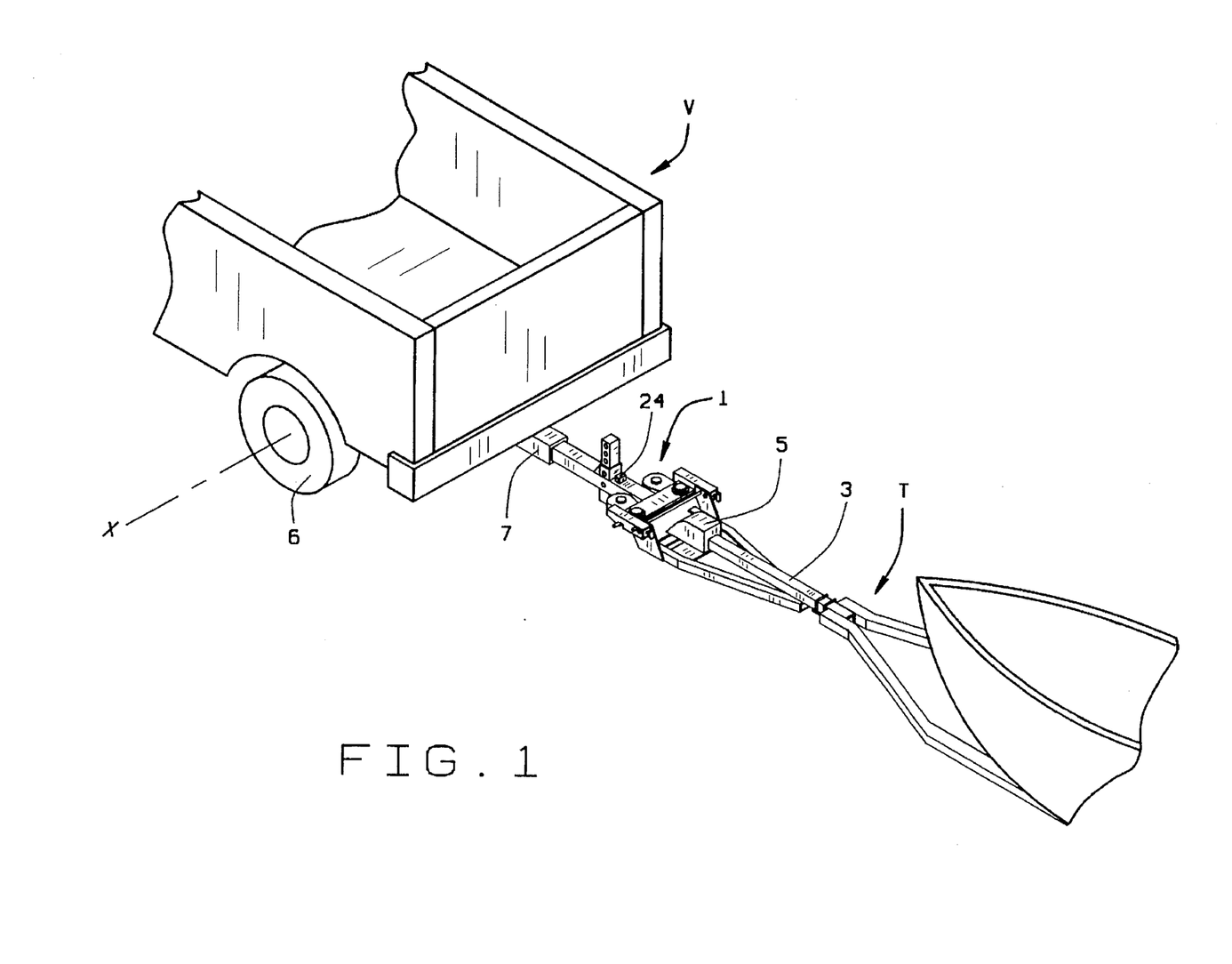
FIG. 1 is a perspective view of a trailer connected to a tow vehicle with a hitch assembly constructed in accordance with and embodying the present invention.

Referring now to the drawings, particularly FIG. 1, a boat trailer T is coupled to a tow vehicle V with a hitch assembly 1 of the present invention. It will be appreciated by those skilled in the art that trailer T, as illustrated has a projecting frame member or tongue 3 which has a conventional coupler/surge brake 5 at the forward end to engage a hitch ball 146 (FIG. 5) protruding upwardly from hitch assembly 1, as will be described in greater detail below. The surge brake 5 generally contains a master cylinder that is hydraulically connected through lines to brakes at the wheels of trailer T. In general, a conventional surge brake is actuated when the tow vehicle slows or stops and the forward movement of the trailer urges the master cylinder against the hitch ball, which in turn, causes hydraulic actuation of the brakes at the trailer wheels. The hitch assembly 1 of the present invention can accommodate trailers employing conventional surge brakes as well as trailers employing more exotic braking mechanisms.

It will also be appreciated by those skilled in the art that although trailer T, as illustrated, is a boat trailer employing a surge brake mechanism, hitch assembly 1 can be used with other types of trailers. For example, hitch assembly 1 can be used with a utility trailer, a camping trailer or any other type of trailer without departing from the scope of the invention. Further, as used in the specification and the appended claims, the term trailer is intended to include any type of towable device or vehicle that can be pulled behind or trails a tow vehicle The boat trailer T of FIG. 1 is illustrative only.

Despite the fact that hitch assembly 1 is well aft of the rear axle of the tow vehicle V, the trailer T and tow vehicle V, when operated over the road in a combination, possesses good lateral stability and exhibit little or no tendency to sway or fishtail when buffeted by cross winds or when otherwise subjected to lateral forces. This stability derives from the fact that the effective pivot axis for hitch assembly 1, at least when the trailer is directly behind the tow vehicle, is projected a considerable distance forwardly and may even be in the region of the rear axle of tow vehicle V. This effective projection of the pivot point of hitch assembly 1 will be explained in greater detail below. Further, the basic construction and operation of my novel converging links that effectively project forwardly the pivot point of the hitch assembly is disclosed in detail in my U.S. Pat. No. 4,722, 542, the disclosure of which is hereby incorporated by reference. Tow vehicle V can be a conventional automobile, a van, or truck such as the pickup truck shown in FIG. 1. Tow vehicle V includes rear wheels 6 which revolve about an axis x. The tow vehicle includes a conventional hitch box 7 which accepts and secures a hitch bar which is part of, and protrudes from, the first pivot element of hitch assembly 1, as will now be described in greater detail. Hitch box 7 is appropriately secured to tow vehicle, preferably to the framework of the tow vehicle in any conventional or accepted manner.

As best seen in FIGS. 2 and 7–11, Hitch assembly 1 includes a forward or first pivot element 9 and a rear or second pivot element 11. First pivot element 9 includes a hitch bar 13 that is the portion that is conventionally received into the hitch box 7. Hitch box 7 has a opening (not shown) which is sized to accept the forward end of the hitch bar 13 without excessive free motion. The end of hitch bar 13 is secured in the hitch box by means of a removable pin which is inserted through aligned holes formed in the end of the hitch bar and the hitch box or by a bolt or screw or other appropriate means. Thus, the hitch bar 13 and the hitch box 7 constitute connecting members for securing the first pivot element 9 to the tow vehicle.

The hitch bar 13 includes a forward segment 15 and an aft segment 17 with a height adjustment assembly 18 to adjustably join the forward and aft segments of the hitch bar so that the hitch assembly can accommodate trailers having tongues of various heights from the ground. The forward segment terminates in an integrally attached upright member 19. The aft segment includes a sleeve 21 at its forward end. Upright member 19 includes a plurality of holes 22 formed therethrough. Sleeve 21 also has at least a pair of holes 23 formed therein. The sleeve 21 can be positioned on upright member 19 and secured by bolts 25 or pins or other appropriate structures that are inserted through holes 23 and the selected holes 20 so that the first pivot element 9 is an appropriate height from the ground. Hitch bar 13 also includes a stop 24 behind the adjustment assembly to keep the connecting links from completely reversing when the tow vehicle and trailer are negotiating a severe turn, will be explained in greater detail below. Although in the preferred embodiment the height adjustment assembly 18 just described is used, the invention contemplates any such mechanism that can adjust the height of the hitch assembly between the rear of the tow vehicle and the trailer tongue.

The first pivot element 9 includes a converging link assembly 30 which functions in a manner consistent with the function of the links described in detail in my U.S. Pat. No. 4,722,542 which is hereby incorporated by reference. In general, the converging link assembly includes a front pivot mount 31 which includes a first pivot boss 32 on one side of the hitch bar and a second pivot boss 34 on the opposite side of the hitch bar. The respective bosses 32 and 34 are spaced apart equidistantly from the common centerline of the hitch box 7 and hitch bar which is also the longitudinal centerline of the tow vehicle V and they are spaced equidistantly from the rear of the tow vehicle or, in other words, they are located along a line that is perpendicular to the center line l. Each pivot boss includes internal bushings (not shown). The pivot boss and bushing combinations function as bearings. A first connecting link 36 is pivotally attached to the first bearing and a second connecting link 38 is pivotally attached to the beating by pivot pins or other appropriate means which allow the links to rotate freely in the bosses. Each of the connecting links are equal in length and are directed rearwardly from their bearing. Link 36, at its trailing end, is pivotally connected to a bushing 40 and link 38, at its trailing end is pivotally connected to a bushing 42 on a pivot mount 44. Pivot mount 44 is located slightly to the rear of pivot mount 31 and likewise slightly above that mount. In this embodiment, pivot mount 44 is substantially flat, substantially rectangular plate. Pivot mount 44 includes a pair of spaced apart pins 45, 47 which extend laterally from the sides of the plate for the pivotal attachment of the second pivot element, as will be explained below. The bushings 40, 42 are closed at their upper ends and likewise function as bearings. It will be noted that the bushings 40 and 42 are spaced apart on a line that is perpendicular to the longitudinal center line l but are spaced somewhat further apart than the bosses 32 and 34.

Figure 7:
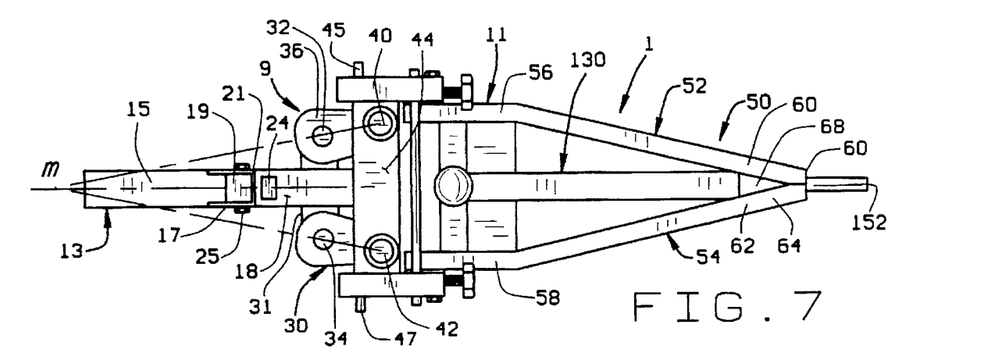
FIG. 7 is a top plan of the hitch assembly showing the configuration it would assume when the tow vehicle is moving straight ahead.
Figure 8:
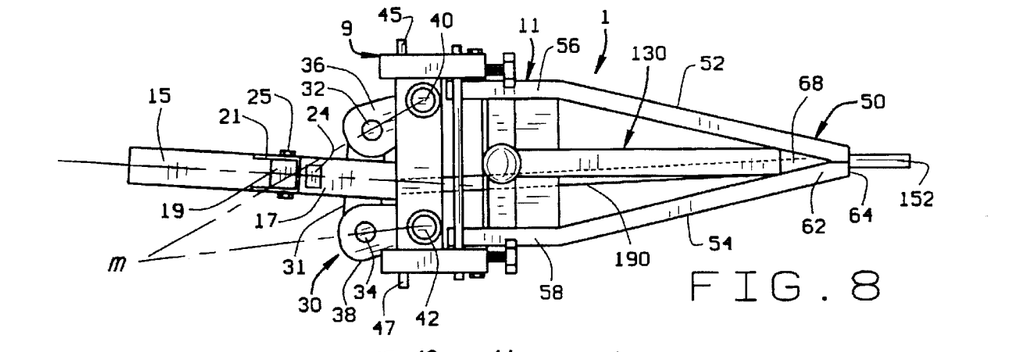
FIG. 8 is a top plan of the hitch assembly showing the configuration it would assume when the tow vehicle negotiates a moderate right turn.
Figure 9:
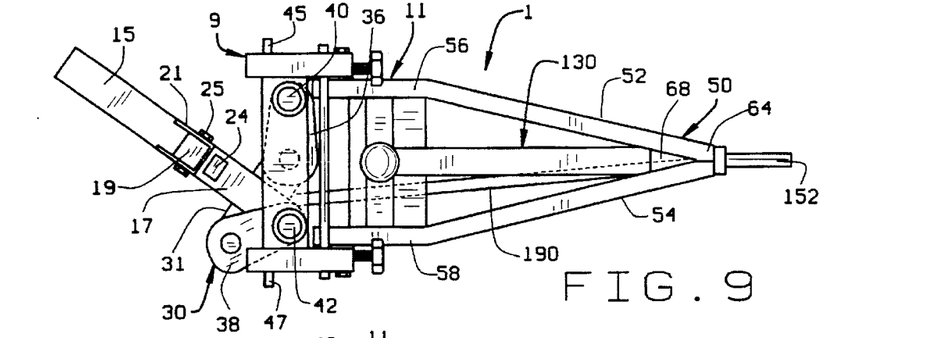
FIG. 9 is a top plan of the hitch assembly showing the configuration it would assume when the tow vehicle negotiates a severe right turn.

Thus, when the rear pivot mount 44 is centered behind the front pivot mount 31, that is when its bushings 40 and 42 are positioned equidistantly from the centerline m, as best seen in FIG. 7, the connecting links converge forwardly. The convergence is such that links 36, 38, if extended forwardly will meet along the centerline m perhaps three to four feet ahead of the rear of the tow vehicle V or more accurately as shown in FIG. 7, lines extended forwardly through the bearings for each link will intersect along the centerline m of the tow vehicle at a point that is between the hitch box 7 and the axis x of the rear wheels 6 or, perhaps beyond the rear wheels. This converging link design, by effectively moving the pivot point forward of the hitch box and adjacent or beyond the axis of the rear wheels, prevents side-to-side movement of the trailer during towing, thereby effectively eliminating fish-tailing. This symmetrical positioning of the links 36, 38 generally exists when the rear pivot mount 44 is directly behind the front mount 31 and hitch bar 13. When the rear mount 44 is shifted to one side or the other, the intersection of the lines transfers to points which are located closer to the hitch box 7 and offset from the centerline m (FIG. 8). Indeed, the geometry of the arrangement is such that the rear pivot member 44 may move to a position in which it lies directly over and parallel to one of the links (FIGS. 9 and 10) and, if there were no physical stop, e.g. upright member 19, the rear mount 44 could be moved to a position wherein one of the links projects straight forward, while the other projects generally rearwardly.

It will be appreciated front the foregoing description that forward pressure against the links, for example if tow vehicle V slows and stops and the trailer T does not, can cause the rear pivot mount 44 to move to one side or the other by pivoting on the links. That is, the connecting link assembly would fold and allow the hitch assembly to jack-knife. Therefore, as explained above, such a design functions well with trailers that employ independent braking system. However, on lightweight trailers or other trailers employing a surge brake system, some forward movement of the trailer is required to actuate the surge brake. The rear or second pivot element 11, as will now be described in detail, preserves the anti-sway features of the converging links, yet is used without side struts or springbars while still effectively preventing undesirable movement of the rear pivot mount 44, jack-knifing or excessive pressure on the connecting links.

Figure 4:
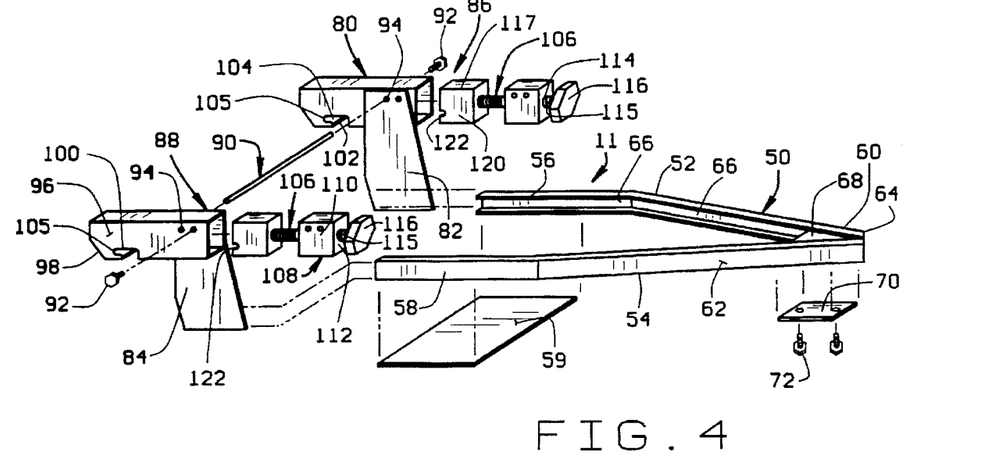
FIG. 4 is an exploded view of the second or rear pivot member of the hitch assembly of the present invention.

The second pivot element 11 as shown in the drawings, and particularly FIG. 4, includes a sliding frame or yoke 50 providing a trailer mount support. Yoke 50 includes spaced side members 52, 54 which have substantially parallel forward sections 56, 58 respectively. There is a bottom plate 59 extending between the parallel sections. Bottom plate 59 can be welded or otherwise appropriately attached to the undersides of the parallel sections. Side members 52, 54 also include aft sections 60, 62 respectively which come off the parallel sections at inward angles and eventually join and form an open-ended tail section 64. As best seen in FIG. 4, the side members are formed from substantially C-shaped beams which define internal channels 66. The tail section 64 has an upper plate 68 and removable lower plate 70 which is removably attached to the bottom surfaces of the respective side members with screws 72, bolts or other appropriate attachment means. The respective side member channels and upper and lower plates cooperate to form a passage for the end of the hitch mount that will be described below.

A coupling assembly 80 is attached to the forward ends of the side members 52, 54 adjacent the parallel segments 56, 58. In the illustrated embodiment, the coupling assembly includes a first side brace 82 attached near the end of side member 52 and a second side brace 84 attached near the end of side member 54. The respective side braces are substantially flat plates which can be welded, bolted, riveted or otherwise attached at the bottom to the ends of the side members. Side brace 82 has a clamp assembly 86 attached to the top edge and side brace 84 has a clamp assembly 88 attached to the top edge. A brace 90 extends between the respective clamp assemblies to provide lateral stability. In the embodiment shown, brace 90 is a tube or appropriate brace means inserted through holes 94 in the clamp assemblies. Clamp assemblies 86 and 88 are identical in design and function. It will be appreciated that the coupling assembly can be constructed without side braces 82, 84. The clamp assemblies 86, 88 are attached directly to the side braces of the yoke. Such a design can be used to reduce the overall height of the hitch, if needed, and is included in the scope of the invention.

Each clamp assembly includes a housing 96 which, in the illustrated embodiment, is constructed from box tubing. Each housing is open-ended and has an beveled forward end 98. Each housing has a opening or notch 100 formed in the bottom side adjacent the bevel. It will be appreciated that the notch 100 has a substantially vertical section 102 and a substantially horizontal section 104. Section 104 has a rounded forward end 105. Each housing seats a clamp 106. Each clamp has a first block 108. The sides 110 of block 108 includes pair of holes formed therein and is secured in the housing by screws 92 or other means. Opposed sides 112 formed at a right angles to the first sides include a threaded hole 114 formed through the center of the block. It will be appreciated that block 108 also could be an L-shaped bracket or the like having a threaded hole in one side. An elongated threaded screw 115 is threadedly engaged in hole 114. As illustrated, threaded screw 115 has a hex-shaped head 116 at a proximal end for the application of a suitable wrench or the like to facilitate rotation. However, the screw could have a T-handle or other configuration that would allow the user to grasp the screw and manipulate it. Threaded screw includes a second block or jaw 117 suitably affixed at its distal end. Rotation of screw 115 in the treaded hole will move jaw 117 backward and forward within the housing. The side wall 120 of jaw has a rounded notch 122 formed in its forward edge. It should be noted that rounded notch as the same generally radius as, and is complementary to, the rounded end 105 of horizontal section 104 of notch 100 formed in the housing. Each clamp 106 is fixed within the housing by screws 92. The screw 115 is of an appropriate length so that jaw 117 extends into notch 100.

The coupling assembly 80 attaches the second pivot element 11 to the first pivot element as follows: each screw 115 is rotated in a counter-clockwise direction so as to withdraw each jaw 117 from each notch 100. The notches 100 are placed over pins 45, 47 which protrude laterally from rear mount 44. The screws 115 then are rotated in a clock-wise direction urging the jaws 117 toward the respective rods. The notches 122 engage the rod. As the clamp is tightened, notch 122 and rounded section 105 of notch section 100 cooperate to form a circular opening. Thus, each pin 45, 47 seats relatively tightly in the clamp and is prevented from slipping out of the notch. Further, each pin is impinged by the jaws but can rotate slightly without causing excessive wear on the clamp components. This rotation within the circular openings allows for some flexion in the hitch assembly at the point where the first pivot element is connected to the second pivot element.

Figure 2:
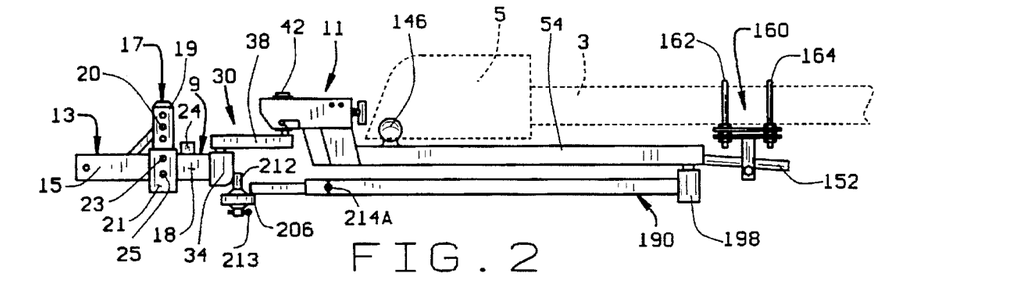
FIG. 2 is a side elevational view of the hitch assembly of the present invention.
Figure 3A:
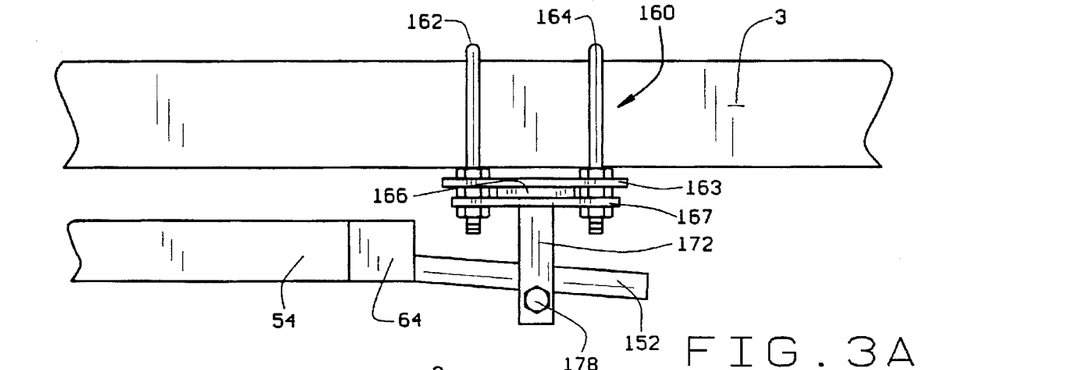
FIG. 3A is a side elevational view of the frame bracket mounted to the trailer frame member and supporting the rear section of the hitch assembly of the present invention.
Figure 3B:
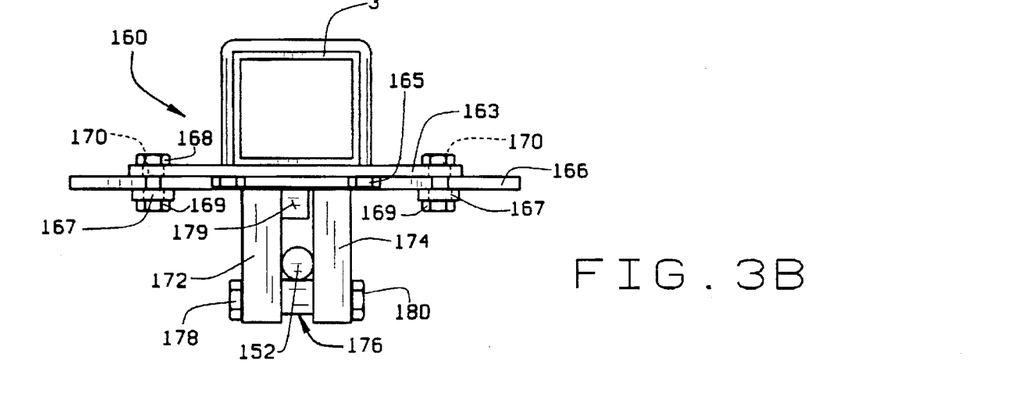
FIG. 3B is a front elevational of the frame bracket of FIG. 3A.
Figure 3C:
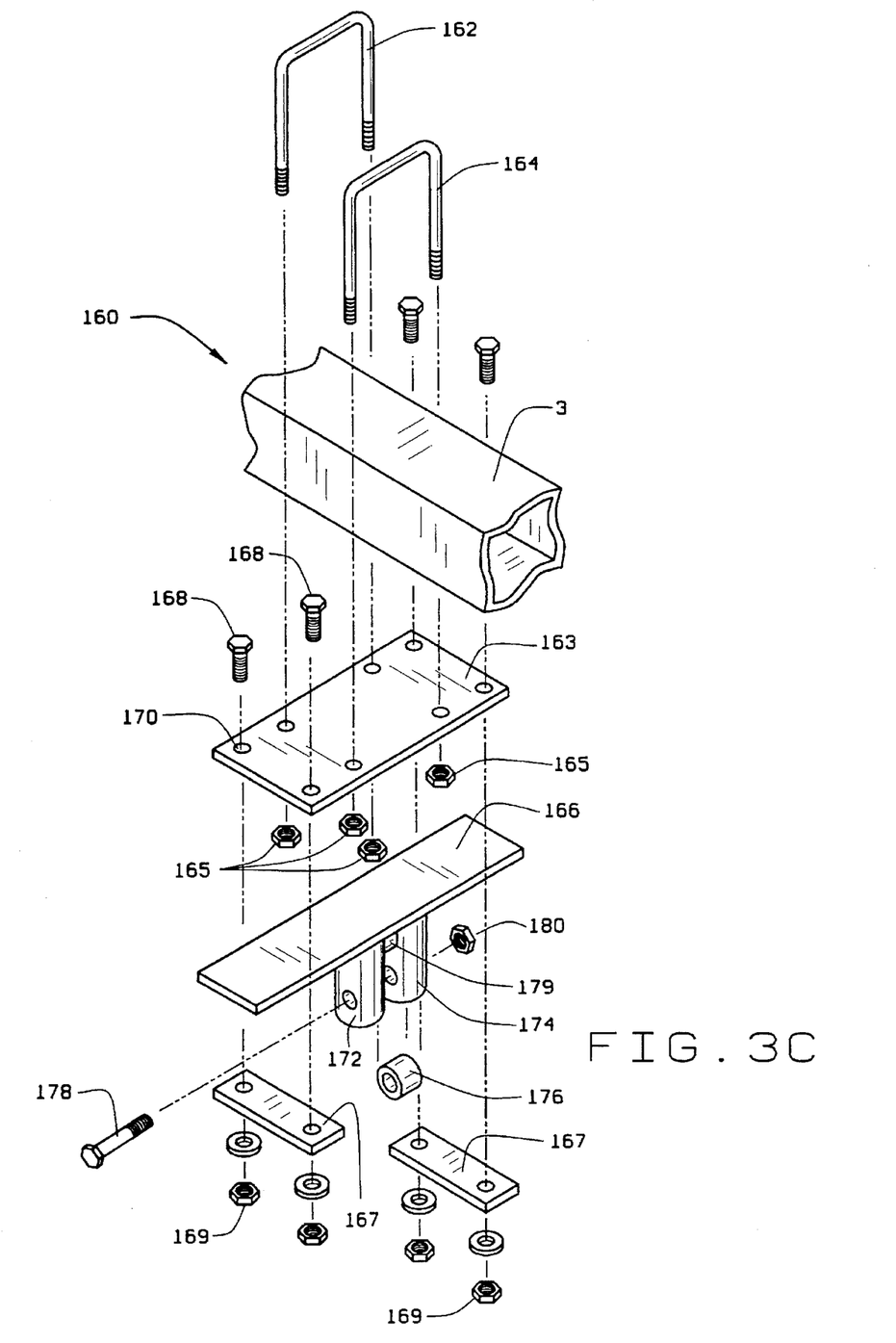
FIG. 3C is a from exploded view of the frame bracket of FIG. 3A.
Figure 5:
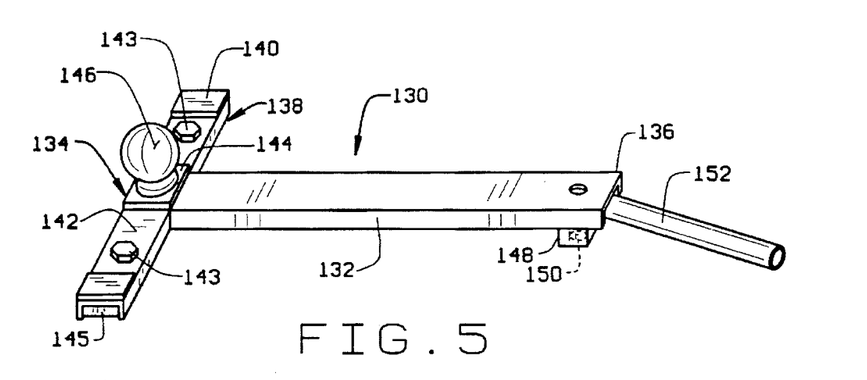
FIG. 5 is an enlarged perspective view of the trailer mount of the hitch assembly of the present invention.

The second pivot section 11 also includes a hitch mount 130 providing a trailer mount which slidably engages yoke 50, and which is shown in greater detail in FIG. 5. Hitch mount 130 has T-shaped configuration and includes an elongated body section 132 having a first or proximal end 134 and a second or distal end 136. Mount 130 includes a cross member 138 at the proximal end perpendicular to the body section. Cross member 138 is dimensioned to seat in the yoke 50 so that the ends of cross member 138 seat in the channels 66 of the parallel sections 56, 58 of the side members of the yoke. The yoke 50 is thus free to slide on the cross member 138. Body section 132 can be formed from metal channel, as can cross member 138, to decrease the weight of the hitch mount. When the cross member 138 is constructed from channel, as shown, spacers 140 and 142 are bolted with bolts 143 or appropriately attached at each end of the top surface of the channel and a reinforcement plate 144 also is welded between the two spacers. Plastic slides 145 are seated in the cross member adjacent the outer ends. The slides function as bearing surfaces. In the illustrated embodiment, a conventional hitch ball 146 is bolted or otherwise attached to the cross member 138 through a hole (not shown) formed in the reinforcement plate and cross member. Hitch ball 146 accepts the conventional hitching mechanism, for example a trailer coupler including surge brake 5, as shown in FIGS. 2 and 3 and, therefore, is the point at which the trailer actually is attached to the hitch assembly 1 of the present invention. Although not shown, it will be appreciated that the plastic slides 145 cut to fit inside the channel are positioned at each end under the spacers and function to reduce friction and wear between the cross member and the channels 66 in the yoke as the yoke moves back and forth relative to the cross member. The slides 145 can be constructed from plastic or nylon or even self-lubricating type material such as Teflon brand non-stick coating. Although the hitch mount just described has multiple elements, the hitch mount can be constructed from solid metal pieces welded together or otherwise appropriately joined in a simple T-shaped configuration without departing from the scope of the present invention.

Body member 132 includes a mounting block 148 in the distal end 136. The mounting block 148 has a threaded bore 150 formed therein for the attachment of a strut ball joint as will be further explained below. The distal end 136 of the body member also includes a tail 152. Tail 152, in the preferred embodiment, is an elongated tube welded or otherwise appropriately attached to the distal end of the member or to the mounting block 148 at a slight downward angle. As stated above, cross member 138 is in sliding engagement within the yoke. The distal end 136 of the body member 132 is positioned within the tail section 64 of the yoke. When assembling second pivot element 11, the cross member 138 can be installed within the channels 66 and the distal end 136 of the body member 132 and the tail 152 positioned in the passageway in tail section 64. Bottom plate 70 then is attached to support the distal end of the body member. Tail 152 extends out of the open-ended tail section 64 of the yoke and is supported by the a frame bracket 160, which is shown in greater detail in FIGS. 3A and 3B, and which will now be described in greater detail.

Frame bracket 160 is attached to the trailer frame member or tongue 3 at an appropriate distance from the rear of yoke. 50. Bracket 160 includes a forward U-bolt 62 and a rear U-bolt 164. An upper plate 163 is attached to the U-bolts by nuts 165 or the like. A lower sliding plate 166 is secured between the upper plate and clamp straps 167 by bolts 168 and nut 169. Bolts 168 extend through laterally elongated holes 170 formed in the upper plate 163 and engage the clamp straps 167. The bolts can be loosened and the plate 166 move side-to-side and then the bolts tightened. Thus, the sliding plate 166 can be moved side-to-side relative to the upper plate 163 and the trailer tongue 3. The sliding plate 166 includes a pair of spaced apart depending vertical tubes 172, 174 which are welded to the bottom surface of the plate 166. In the preferred embodiment, tubes 172, 174 are spaced approximately 1⅛ inch apart or an appropriate space to allow tail 152 to slidingly fit between them. There is a roller 176 between the lower ends of tubes 172, 174. The roller comprises a bolt 178 extending through vertical tubes 172, 174. The roller 176 supports tail 152 and also allows tail 152 some forward and rearward movement within bracket 160. A stop 179 is affixed between the upper ends of the tubes 172, 174 and functions to engage the tail end 64 of the yoke 50 upon its upward movement. Further, since plate 166 can be moved side-to side relative to the upper plate 163 and tongue 3, bracket 166 is used to linearly align hitch mount 130 and hitch box 7 on the back of the tow vehicle in the event the tongue 3 or other components of the hitch assembly are not in perfect alignment with the tow vehicle. Thus, the user can adjust the rear bracket 160 to make sure the trailer tracks straight behind the tow vehicle.

Figure 6:
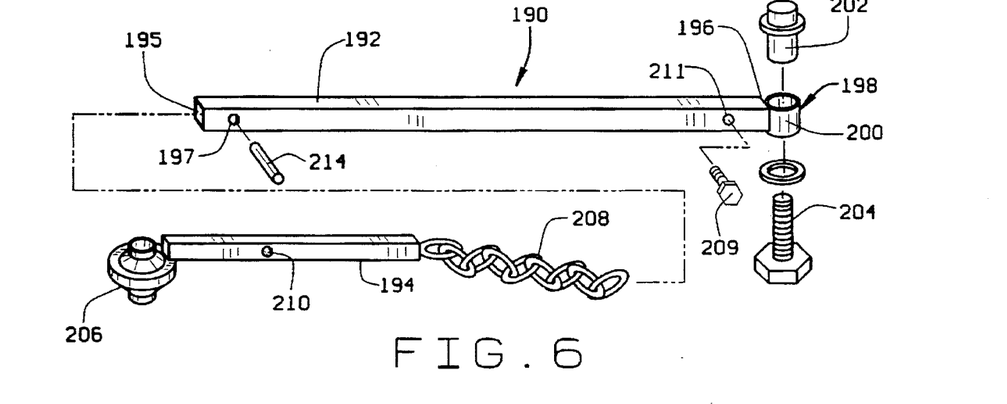
FIG. 6 is an enlarged exploded view of the support strut of the hitch assembly of the present invention.
Figure 10:
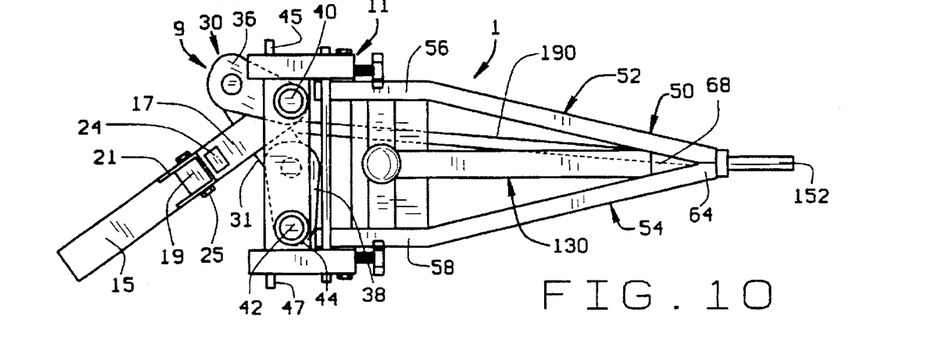
FIG. 10 is a top plan of the hitch assembly showing the configuration it would assume when the tow vehicle negotiates a severe left turn.
Figure 11:
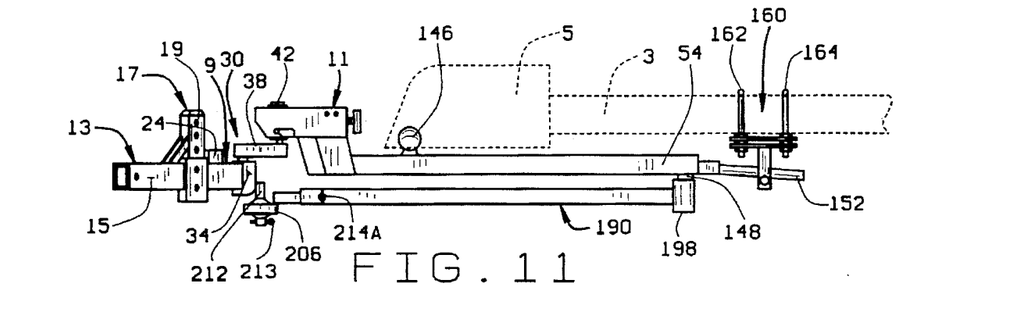
FIG. 11 is a side elevational view of the hitch assembly showing the configuration it would assume when the tow vehicle negotiates a left turn.

Hitch assembly 1 also includes a pivotal strut assembly 190 attached between the first pivot element 9 and the hitch mount 130, as shown in FIGS. 2 and 10. The strut assembly 190 itself is shown in greater detail in FIG. 6. Strut assembly 190 includes a strut tube 192 and a strut bar 194 which is slidingly engaged in strut tube 192. Strut tube 192 includes an open proximal end 195 and a distal end 196. There is a locking pin hole 197 formed in the tube adjacent the proximal end. Tube 192 includes a bushing assembly 198 at the distal end. Bushing assembly includes a boss 200 at the distal end of the strut tube and a bushing 202 seated in the boss. As mentioned above, bushing assembly 198 is pivotally attached to the mounting block 148 in the tail end of the yoke with a washer and bolt 204 which is inserted through bushing 202 and engages threaded hole 150 in the mounting block.

The strut bar 194 includes a ball joint 206 at its proximal end and a short safety chain 208 at its distal end with a locking pin hole 210 formed in the bar near a mid-point. Ball joint 206 is a conventional ball joint that is secured over a pivot pin 212 (FIGS. 2, 10) that extends downward from the center of the bottom side of the first pivot mount 31 of pivot element 9 (FIGS. 2 and 3). It should be noted that pivot pin 212 in the illustrated embodiment is positioned on the bottom of the first pivot element 9. However, it is also possible to raise the pivot pin, for example to rear of the first pivot element so as to increase ground clearance. Further, although the illustrated embodiment shows a ball joint 206, the present invention can include a conventional bushing or other appropriate pivoting connector at the site.

The ball joint 206 is placed on the pivot pin and secured with a cotter pin 213 (FIGS. 2 and 11) inserted in an opening in the pin or by other means. It will be appreciated that the strut bar. 194 is slidingly engaged inside strut tube 192. The safety chain 208 is attached to a bolt 209 through a hole 211 to prevent untoward separation of the bar and tube in use. The assembled tube and bar includes a locking pin 214 that engages the respective locking pin holes to secure the tube and bar in the appropriate linear alignment. Although shown as a simple locking pin for clarity in FIG. 6, in the preferred embodiment, pin 214 can be a spring-load pin in a housing permanently affixed to the outside of tube 192 in lieu of hole 197. Such a spring-loaded locking pin mechanism, indicated generally by reference numeral 214A in FIGS. 2 and 11, facilitates the attachment of the second pivot element 11 to the first pivot element 9. For example, the first pivot element 9 is attached or can remain attached to the hitch box 7. To attach the second pivot element 11, the user only need to have the first pivot element 9 relatively close to the second pivot element 11. Since the yoke 50 can slide relative to the hitch mount 130, the yoke can be slid forward or backward so that the coupler assembly 80 can engage the pins 45, 47 and be tightened. The spring-loaded pin 214A is withdrawn and the strut bar 194 pulled out until the ball joint 206 can be secured on pivot pin 212. The user is not required to set the pin 214 back in the hole. As the tow vehicle and trailer are moved forward or backward, pin 214 eventually will find and seat in hole 210, thereby locking the strut bar 194 inside strut tube 192.

It will be appreciated by those skilled in the art that strut assembly 190 is attached to the underside of the first pivot element and to the distal end of the hitch mount 130. When the tow vehicle and trailer are moving in a substantially straight line, strut assembly 190 and the hitch box 7 are in linear alignment. Further, since the strut assembly is directly attached to the hitch mount, the forces exerted on the hitch assembly, i.e. pushing and pulling forces inherent in towing a trailer, are transferred through the strut assembly 190 and not through the converging links, thus satisfying another object of the present invention. The converging links function to prevent side-to-side movement and allow for turning, but do not receive the push-pull forces inherent in towing a trailer. Moreover, the novel combination of the strut assembly 190, hitch mount 130 and yoke 50 function to maintain the trailer a uniform distance from the tow vehicle, even when negotiating relatively sharp left or right turns, as will now be explained in detail.

The relative relationship and function of the elements of the hitch assembly 1 of the present invention when the tow vehicle and trailer are negotiating rams are shown in FIGS. 2 and 8–11. As the tow vehicle turns relative to the trailer, hitch bar 13 necessarily moves in the direction of hitch box 7. The converging link assembly pivots to allow turning. As the individual links 36, 38 pivot, the relative radius of the links shortens and pivot mount 44 is drawn forward. Since the coupler assembly 80 is attached to pivot mount 44, as the radius of the links shorten, the coupler assembly and the attached yoke 50 are drawn toward the rear of the tow vehicle. However, since the strut assembly 190 is rigid and connected to the hitch mount 130, the hitch mount is held back relative to the yoke 50, as best seen by comparing the positioning of the elements in FIG. 2 to those in FIG. 11 as well as comparing FIG. 7 to FIGS. 8, 9 and 10. In other words, the yoke moves forward around the hitch mount 130 and the tail 152 which is suspended in bracket 160. Since hitch mount 130, with the hitch ball 146 and trailer attached thereto, are held in place by strut assembly 190, the trailer remains a predetermined distance (e.g. the length of the strut assembly 190 plus a small change in radius of strut assembly 190 as it moves side-to-side (FIGS. 8–10)) away from the rear end of the tow vehicle, thereby satisfying another object of the invention.

Various changes and modifications can be made in the hitch assembly of the present invention without departing from the scope of the appended claims. For example, other coupler assemblies may be used that appropriately attaches the second pivot element to the first pivot element. Further, the frame of the second pivot element can be constructed in other configurations including the yoke described, but also including, for example, a single, centrally positioned channel member in sliding arrangement with the trailer mount element. The frame or yoke could have various other configurations and still fall within the scope of the present invention. Likewise, the sliding relationship between the trailer mount and frame could be achieved by other structure. For example, the trailer mount could be slidingly connected to a frame with casters, ball beatings or other structures that maintain the sliding relationship, all of which are included within the scope of the invention.

Likewise, the strut assembly can be comprised of a simple, single-piece strut bar with pivots or conventional bushings at each end. Also, if the hitch assembly of the present is to be used with a trailer having an extending A-frame member rather than a tongue 3, bracket 160 can be constructed to span between the side members of the A-frame so as to support and align the tail end of the hitch mount 130. The hitch ball on the hitch mount could be replaced with another structure that allows for the connection of the trailer to the hitch mount. Moreover, the hitch assembly 1 of the present invention has been described and illustrated in use with a trailer employing a surge brake system. However, the hitch assembly 1 can be used with a trailer employing conventional electric brakes, if so desired. Although hitch assembly 1 allows a surge brake system to function, it is not limited to use with such trailers.

These and other changes or modifications are within the scope of the invention. Therefore, the foregoing description and accompanying drawings are intended to be illustrative only, and should not be viewed in a limiting sense.

I claim:

1. A hitch assembly for coupling a trailer to a tow vehicle, the hitch assembly comprising:

a first pivot element mounted to the tow vehicle;

a second pivot element on a forward end of a trailer frame member extending from the trailer;

a pair of converging links pivotally connected to said first pivot element and said second pivot element and extending between said first and second pivot elements whereby the angular position between the first and second members can be varied, said converging links effectively moving the pivot point between said tow vehicle and said trailer forward of the hitch assembly;

said second pivot element including a trailer mount support, a trailer mount for attachment to the the trailer, the trailer mount being in sliding engagement with said trailer mount support; and a support strut pivotally attached to and extending between said first pivot element and said trailer mount, the support strut disposed to accent the pushing and pulling forces exerted when the tow vehicle tows the trailer so that said pushing and pulling forces are not exerted on said converging links.

2. The hitch assembly of claim 1 wherein said trailer mount support includes a frame having spaced apart side members, each said side member having a channel formed therein to engage said trailer mount.

3. The hitch assembly of claim 1 wherein said trailer mount further includes a hitch ball at a first end of said trailer mount for the removable attachment of the trailer.

4. The hitch assembly of claim 1 wherein said second pivot element further includes a coupler mechanism for connecting said converging links to said trailer mount support.

5. The hitch assembly of claim 1 further comprising a support bracket attached to the trailer frame member to support a second end of said trailer mount said support bracket being laterally adjustable to adjust the linear alignment of said trailer mount relative to the tow vehicle.

6. A hitch assembly for attaching a trailer to a tow vehicle, the hitch assembly comprising:

a first pivot element mounted to a rear of the tow vehicle adjacent a rear axle of the tow vehicle;

a second pivot element attached to the trailer;

a pair of converging links connecting said first pivot element and said second pivot element, said converging links disposed to move the effective pivot point between the tow vehicle and the trailer forward of the rear axle of the tow vehicle when the tow vehicle and trailer are negotiating a turn;

a trailer mount support connected to said second pivot element;

a trailer mount for attachment to the trailer in sliding engagement with said trailer mount support;

a support strut pivotally attached between said first pivot element and said trailer mount, the support strut positioned so that the forces exerted on the hitch assembly during the towing of the trailer by the tow vehicle are exerted on said support strut and not on said converging links.

7. An anti-sway trailer hitch for attaching a trailer to a tow vehicle, comprising:

a first pivot element attached to said tow vehicle, said first pivot element including a pair of converging links;

a second pivot element attached to said converging links, said second pivot element including a frame and a trailer mount for attachment to the trailer the trailer mount in sliding engagement with said frame; and a support strut extending between said first pivot element and said trailer mount so that the forces exerted on the trailer hitch during the towing of the trailer by the tow vehicle are transferred through said support strut and not the converging links.

8. The trailer hitch as provided in claim 7 wherein said second pivot element further comprises a coupler for releasably attaching said second pivot element to said converging links.

9. The trailer hitch as provided in claim 8 wherein the coupler further comprises a pair of spaced apart adjustable jaws for engaging mounting pins on said second pivot element.

10. The trailer hitch as provided in claim 7 wherein said support strut has a first pivot joint at a first end for pivotal attachment to said first pivot element and a second pivot joint at a second end for pivotal attachment to said trailer mount.

11. The trailer hitch as provided in claim 7 wherein said strut has a first section and a second section slidingly engaged within said first section to allow lengthening and shortening of said strut during attachment of said second pivot element to said converging links.

12. In an anti-sway trailer hitch for connecting a trailer to a tow vehicle, the hitch having a first pivot element attached to the tow vehicle and a second pivot element attached to the trailer with a pair of converging links operatively attached to the first pivot element and extending between the first pivot element and the second pivot element whereby the angular relationship between the first and second pivot elements may be varied, the improvement comprising:

said second pivot element including a support frame having a pair of spaced apart side members, a trailer connecting member having a first end and a second end, the first end in sliding engagement between the spaced apart side members; and a support strut connected to and extending between the first pivot element and the trailer connecting member, wherein said support strut maintains a distance between the first pivot element and the trailer connecting member as the angular relationship between the first and second pivot elements changes.

13. The improved trailer hitch of claim 12 wherein the support strut is pivotally attached to the second end of trailer connecting member.

14. The improved trailer hitch of claim 13 wherein the support strut is pivotally attached the first pivot element.

15. The improved trailer hitch of claim 12 wherein said trailer connecting member further includes a hitch ball for connecting the trailer.

16. The improved trailer hitch of claim 12 wherein said support frame further includes a coupler assembly for releasably coupling said second pivot element to the converging links.

17. The improved trailer hitch of claim 16 wherein the coupler assembly further includes a pair of adjustable jaws for engaging pins on the converging links, wherein said adjustable jaws and pins provides flexure for the trailer hitch.

18. The improved trailer hitch of claim 15 wherein the trailer includes a surge brake assembly that is actuated by a movement of said surge brake assembly against the hitch ball.

19. An anti-sway trailer hitch assembly for coupling a trailer to a tow vehicle comprising:

a first pivot element mounted to the tow vehicle;

a second pivot element on a forward end of a trailer frame member extending from the trailer;

a pair of converging links pivotally connected to said first pivot element and said second pivot element and extending between said first and second pivot elements whereby the angular position between the first and second element can be varied;

said second pivot element including a trailer mount support frame including spaced apart side members, each said side member having a channel formed therein, a trailer mount for attachment to the trailer, the trailer mount being in sliding engagement with the channels of said trailer mount support frame; and a support strut pivotally attached to and extending between said first pivot element and said trailer mount.

20. The hitch assembly of claim 19 wherein forces inherent in towing the trailer are transferred through the support strut and not through the converging links.

21. The hitch assembly of claim 19 wherein said support strut maintains said trailer mount at a predetermined distance from said first element as said support frame moves forward and backward relative to said trailer mount in response to the swinging of the converging links thereby maintaining the trailer attached to the trailer mount at a predetermined distance from the tow vehicle while turning.

* * * * *